US009099256B2

(12) United States Patent
Gole et al.

(10) Patent No.: US 9,099,256 B2
(45) Date of Patent: Aug. 4, 2015

(54) COVER ASSEMBLY FOR AUTOMATIC TRANSFER SWITCH (ATS)

(71) Applicant: ASCO Power Technologies, L.P., Florham Park, NJ (US)

(72) Inventors: Devanand Ramchandra Gole, Warje (IN); Sachin Vinodchandra Shah, Pune (IN)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

(21) Appl. No.: 14/141,225

(22) Filed: Dec. 26, 2013

(65) Prior Publication Data

US 2014/0253268 A1 Sep. 11, 2014

(51) Int. Cl.

| | |
|---|---|
| ***H02B 1/00*** | (2006.01) |
| ***H01H 9/02*** | (2006.01) |
| ***H01H 9/22*** | (2006.01) |
| ***H01H 71/02*** | (2006.01) |

(52) U.S. Cl.

CPC ............. *H01H 9/223* (2013.01); *H01H 71/025* (2013.01); *H01H 71/0214* (2013.01); *H01H 2071/0242* (2013.01)

(58) Field of Classification Search

CPC ... H01H 9/00; H01H 50/00; H01H 2009/347; H05K 5/0213; H05K 7/20945

See application file for complete search history.

(56) References Cited

U.S. PATENT DOCUMENTS

| | | | | |
|---|---|---|---|---|
| D691,566 | S * | 10/2013 | Hashimoto et al. | D13/158 |
| D692,396 | S * | 10/2013 | Hashimoto et al. | D13/158 |
| 2003/0184421 | A1* | 10/2003 | Schultz | 335/220 |
| 2010/0276265 | A1* | 11/2010 | Park et al. | 200/293 |
| 2010/0276266 | A1* | 11/2010 | Park et al. | 200/293 |
| 2010/0307895 | A1* | 12/2010 | Park et al. | 200/237 |

* cited by examiner

*Primary Examiner* — Gregory Thompson

(74) *Attorney, Agent, or Firm* — McDonnell Boehnen Hulbert & Berghoff LLP

(57) ABSTRACT

A cover assembly for an automatic transfer switch (ATS) is provided. The ATS includes an operator-panel portion and a pole-assembly portion, wherein the operator-panel portion comprises at least one solenoid and associated wiring. The cover assembly includes and operator-panel cover and a pole-assembly cover. The operator-panel cover is configured to cover the operator-panel portion such that the at least one solenoid and associated wiring are substantially enclosed, the operator-panel cover comprising a first plurality of ventilation louvers for heat dissipation. Further, the pole-assembly cover is configured to cover the pole-assembly portion, the pole-assembly cover comprising a second plurality of ventilation louvers for heat dissipation.

17 Claims, 7 Drawing Sheets

--Prior Art--

COVER ASSEMBLY FOR AUTOMATIC TRANSFER SWITCH (ATS)

CROSS REFERENCE TO RELATED APPLICATIONS

The present application is a non-provisional of U.S. Design patent application Ser. No. 29/448,576 filed Mar. 13, 2013, which claims priority to Indian Patent Application No. 689/MUM/2013 filed Mar. 7, 2013. The entire disclosure contents of these applications are herewith incorporated by reference into the present application.

BACKGROUND

Unless otherwise indicated herein, the materials described in this section are not prior art to the claims in this application and are not admitted to be prior art by inclusion in this section.

A transfer switch is an electrical switch that reconnects an electric power source from a primary source to a standby source. A transfer switch may be manually or automatically operated. An automatic transfer switch (ATS) may include an operator-panel portion and a pole-assembly portion. The operator-panel portion may include at least one solenoid and associated wiring. Operator-panel portions having a single solenoid or operator-panel portions having dual solenoids are common in existing ATSs. Further, pole-assembly portions of ATSs commonly include a switch that indicates the operational state of the ATS. For instance, the switch may have respective positions that correspond to a normal-operation position and an emergency-operation position.

SUMMARY

In one example aspect, a cover assembly for an automatic transfer switch (ATS) is provided. The ATS may include an operator-panel portion and a pole-assembly portion, wherein the operator-panel portion comprises at least one solenoid and associated wiring. The cover assembly includes an operator-panel cover and a pole-assembly cover. The operator-panel cover is configured to cover the operator-panel portion such that the at least one solenoid and associated wiring are substantially enclosed. Further, the operator-panel cover includes a first plurality of ventilation louvers for heat dissipation. Still further, the pole-assembly cover is configured to cover the pole-assembly portion. The pole-assembly cover includes a second plurality of ventilation louvers for heat dissipation.

In an example embodiment, the pole-assembly portion includes a switch having a plurality of positions comprising a normal-operation position and an emergency-operation position, and the pole-assembly cover includes a side-viewing panel configured to allow an operator to identify each of the plurality of positions of the switch. In another example embodiment, the operator-panel cover comprises a locking arrangement, wherein the locking arrangement comprises at least one snap-fit locking mechanism configured to interact with at least one corresponding snap-fit locking mechanism of the ATS. In yet another example embodiment, the operator-panel cover is configured for use with a dual solenoid arrangement as well as a single solenoid arrangement.

In another example aspect, an operator-panel cover for an operator-panel portion of an ATS is provided. The operator-panel portion may include at least one solenoid and associated wiring. The operator-panel cover may include (i) a body configured to cover the operator-panel portion such that the at least one solenoid and associated wiring are substantially enclosed and (ii) a locking arrangement, wherein the locking arrangement comprises at least one snap-fit locking mechanism configured to interact with at least one corresponding snap-fit locking mechanism of the ATS.

In yet another example aspect, a pole-assembly cover for a pole-assembly portion of an ATS is provided. The pole-assembly portion may include a switch having a plurality of positions comprising a normal-operation position and an emergency-operation position. The pole-assembly cover includes (i) a body configured to substantially cover the pole-assembly portion including the switch; (ii) a plurality of ventilation louvers for heat dissipation disposed on the body; and (iii) a side-viewing panel positioned on a side of the body corresponding to a location of the switch on the pole-assembly portion, the side-viewing panel configured to allow an operator to identify each of the plurality of positions of the switch.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
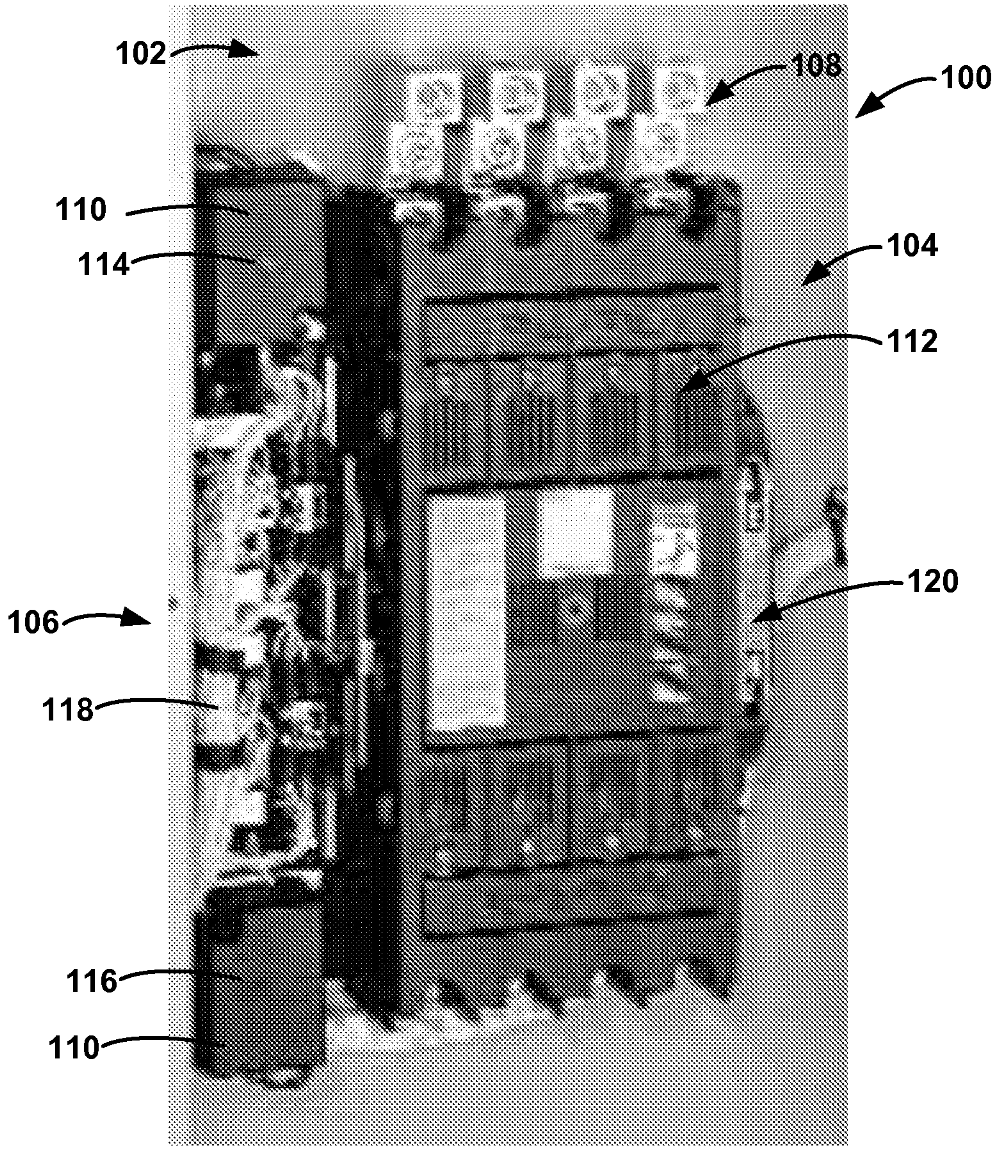
FIG. 1 is an illustration of an example existing cover assembly for an automatic transfer switch (ATS).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

An automatic transfer switch (ATS) is an electrical switch that reconnects an electric power source from a primary source to a standby source. High speed transfer of loads between alternate sources of power may be achieved by a solenoid-operating mechanism in the ATS. An ATS may include an operator-panel portion and a pole-assembly portion. The operator-panel portion may include at least one solenoid and associated wiring and components. In this regard, operator-panel portions having a single solenoid or operator-panel portions having dual solenoids are common in existing ATSs.

Various safety concerns and issues are associated with the operation, maintenance, and repair of an ATS. For instance, an ATS may operate at high voltages, and thus extreme care must be taken during operation of the ATS and/or when an operator is working with an ATS (e.g., during installation or maintenance of the ATS). Therefore, it is important that an ATS be appropriately covered during installation and operation of the ATS.

Existing ATS covers or cover assemblies have numerous drawbacks. For instance, an ATS having a single-solenoid arrangement requires a different cover than an ATS having a dual-solenoid arrangement. As mentioned above, operator-panel portions having a single solenoid and operator-panel portions having dual solenoids are common in existing ATSs. However, different covers being required for different solenoid arrangements may be undesirable for a number of reasons, including but not limited to lack of interchangeability, manufacturing and cost reasons, and installation/repair time. In addition, existing covers do not cover the operator-panel portion such that the at least one solenoid and associated wiring are substantially enclosed. Rather, existing covers cover the at least one solenoid while leaving the associated wiring exposed. However, due to the requirements of the safety of the operator as well as to protect the solenoid assembly and related wiring and harness, for example, it may be beneficial to substantially enclose the at least one solenoid and associated wiring.

FIG. 1 depicts an example existing cover assembly for an ATS. In particular, FIG. 1 depicts a system 100, which includes a transfer switch 102 and a cover assembly 104. The transfer switch 102 includes an operator panel 106 and a pole assembly 108. Similarly, the cover assembly 104 includes an operator-panel cover 110 and a pole-assembly cover 112. In this example, the transfer switch 102 includes a dual solenoid arrangement.

Cover assembly 104 has numerous example disadvantages. For example, the operator panel 106 is not fully enclosed by the operator-panel cover 110. For instance, the operator panel 106 includes a first solenoid, a second solenoid, and associated wiring 118 and other components. This associated wiring 118 is fully exposed in system 100. As another example, the operator-cover portion 110 includes a separate cover for each solenoid of ATS 102. Specifically, the operator-panel cover 110 includes solenoid cover 114 and solenoid cover 116. As mentioned above, having multiple solenoid covers may be undesirable for numerous reasons. For example, installation of the operator-panel cover requires installation of a plurality of covers. Further, maintenance may require more time due to the need to remove each of the plurality of operator-panel covers 114 and 116 separately.

The disclosed cover assembly beneficially offers an improved cover for ATSs, such as for both single-solenoid ATSs and dual-solenoid ATSs. The cover assembly described herein is an improved cover assembly for an ATS that comprises an operator-panel portion and a pole-assembly portion, wherein the operator-panel portion comprises at least one solenoid and associated wiring. The cover assembly may include an operator-panel cover configured to cover the operator-panel portion such that the at least one solenoid and associated wiring are substantially enclosed, the operator-panel cover comprising a first plurality of ventilation louvers for heat dissipation. Further, the cover assembly may include a pole-assembly cover configured to cover the pole-assembly portion, the pole-assembly cover comprising a second plurality of ventilation louvers for heat dissipation.

The disclosed cover assembly may address the aforementioned problems by covering the operator-panel portion such that the at least one solenoid and associated wiring are substantially enclosed. Further, the operator-panel portion may be configured to cover both a single-solenoid arrangement and a dual-solenoid arrangement, beneficially avoiding the need for separate covers for each solenoid of the ATS.

2. Example Cover Assembly for an ATS

Figure 2:
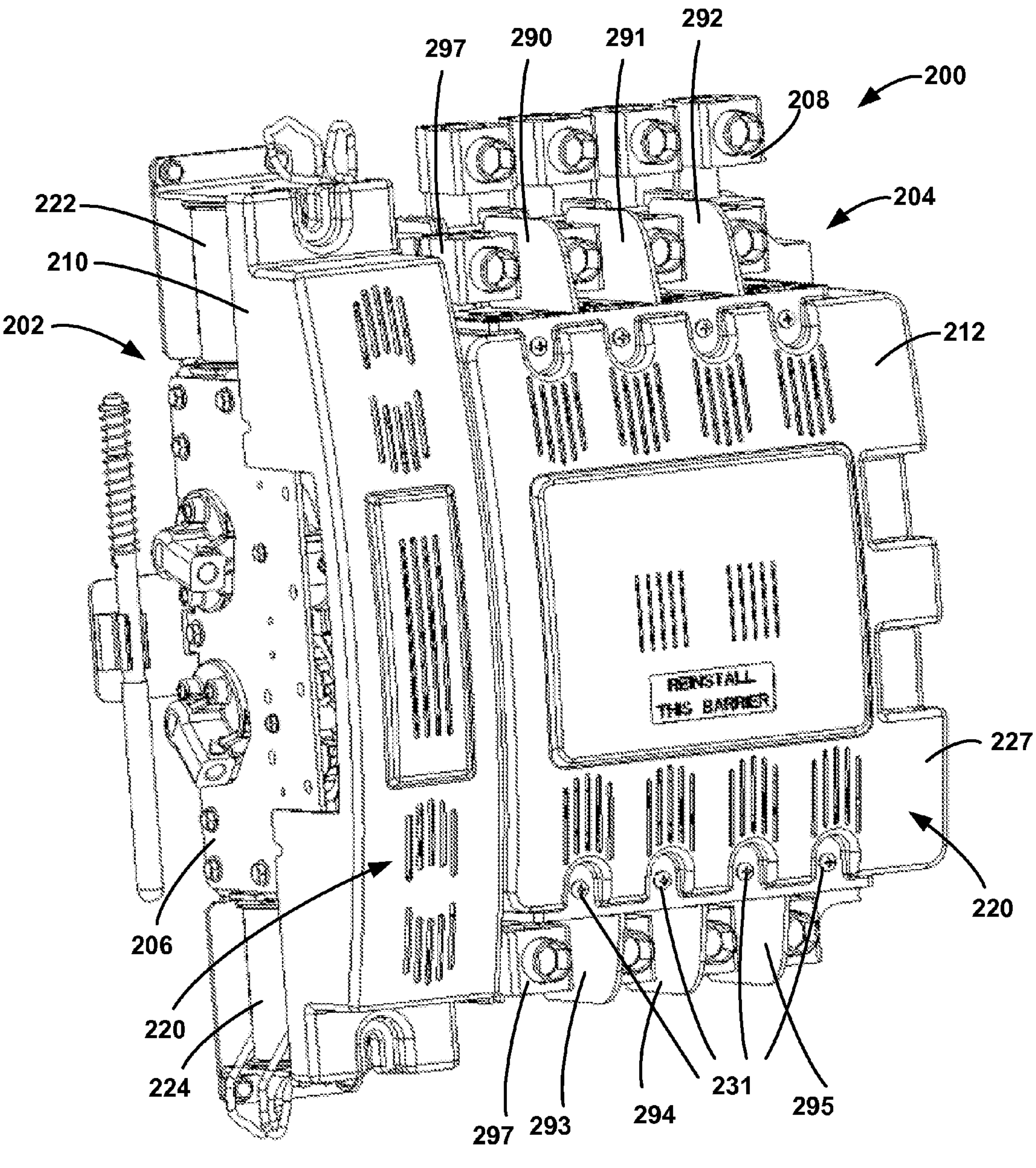
FIG. 2 is an illustration of an example cover assembly for an ATS, according to an example embodiment of the present disclosure.

FIG. 2 is a perspective view taken from a top, front, left side of a cover assembly, according to an example embodiment of the present disclosure. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, it should be understood that all of the discussion above is considered part of this detailed disclosure.

FIG. 2 depicts a system 200 that includes an ATS 202 covered by an ATS cover assembly 204. ATS 202 comprises an operator-panel portion 206 and a pole-assembly portion 208. Further, the operator-panel portion 206 comprises at least one solenoid and associated wiring (both of which are covered by cover assembly 204). The cover assembly 204 includes an operator-panel cover 210 and a pole-assembly cover 212. The operator-panel cover 210 may be configured to cover the operator-panel portion 206 such that the at least one solenoid and associated wiring are substantially enclosed. Further, the operator-panel cover 210 may include a first plurality of ventilation louvers 220 for heat dissipation. The ventilation louvers may be a shutter apparatus with horizontal slats that are angled to admit air but to block dust and other particles from entering the ATS. Still further, the pole-assembly cover 212 may be configured to substantially cover the pole-assembly portion 208. The pole-assembly cover 212 may include a second plurality of ventilation louvers 220 for heat dissipation.

In an example, components included in the operator-panel portion may include a solenoid assembly, a weight and CAM shaft assembly, and an auxiliary contact assembly. The solenoid assembly may include a coil, core tube, moving core, link, spring, and brackets. Electrical supply is to be given to the solenoid assembly due to which it generated electromagnetically attracting force for moving core and thus the whole mechanism operated. Further, the weight and CAM shaft assembly may be connected to solenoid assembly through link. When solenoid operated link pull over the weight shaft assembly. There is a CAM bearing fixed with the weight and CAM shaft assembly which slides along the slots of the drive lever plate in the pole cover area. Still further, the auxiliary contact assembly may be used to provide the position status of the switch to the controller.

Figure 3:
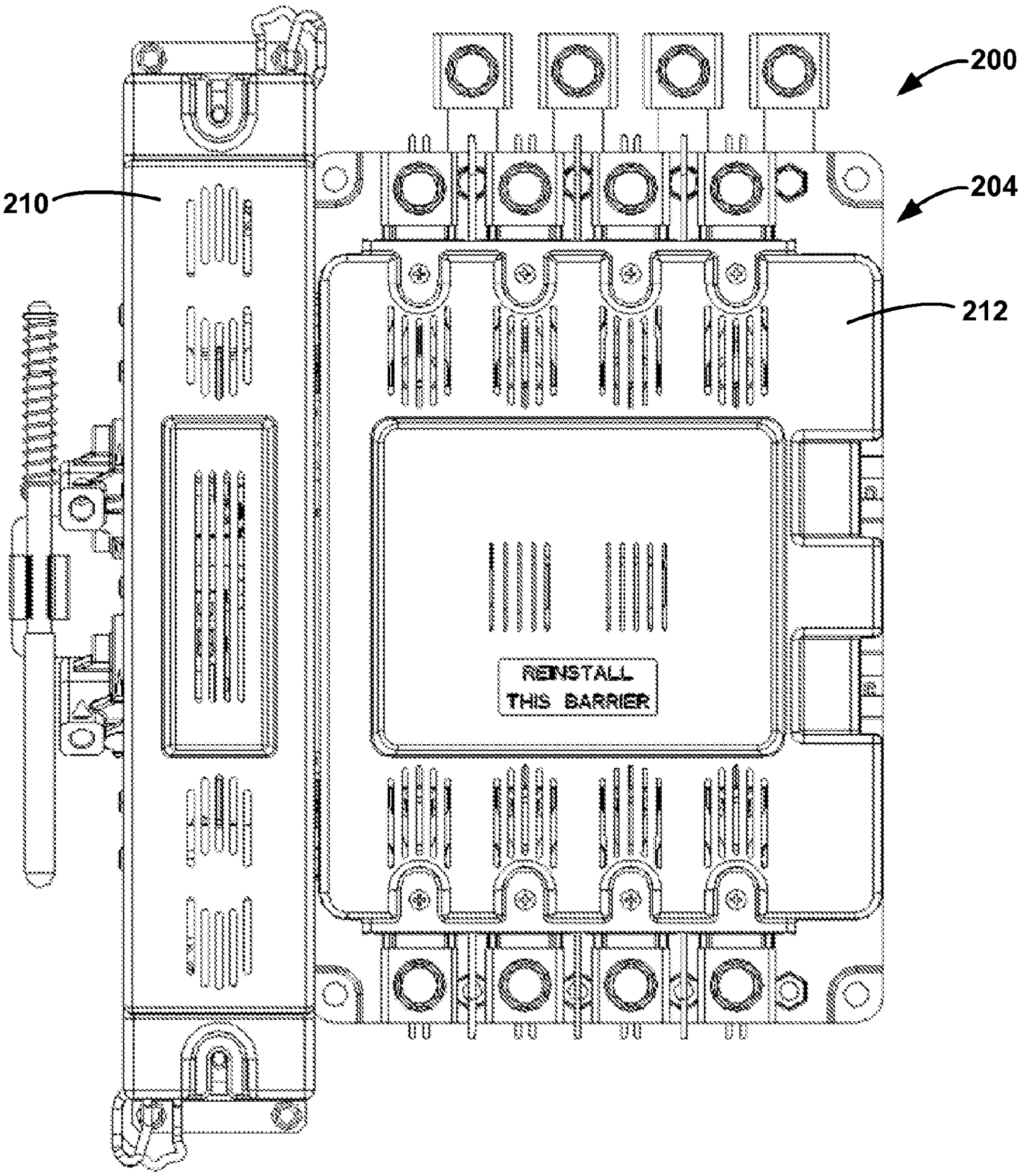
FIG. 3 is a front elevation view of the example cover assembly of FIG. 2.
Figure 4:
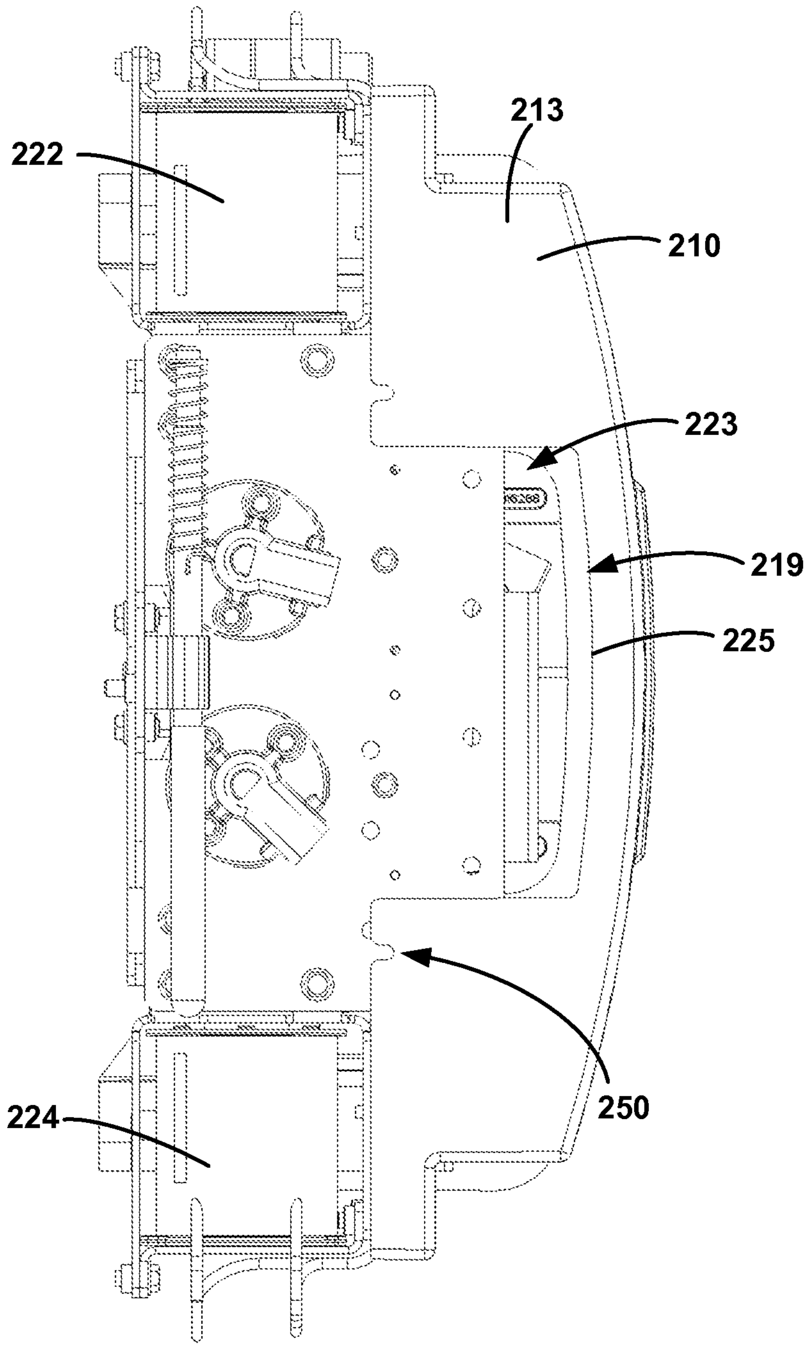
FIG. 4 is a left side elevation view of the example cover assembly of FIG. 2.
Figure 5:
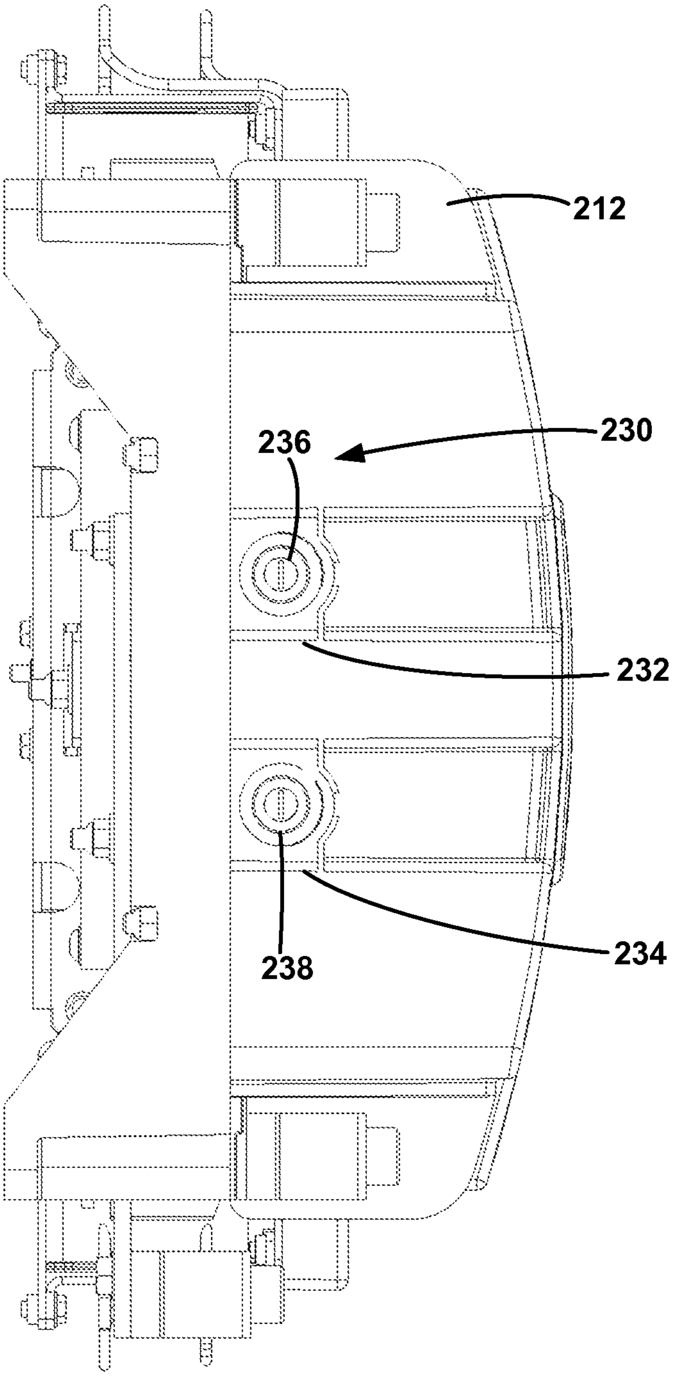
FIG. 5 is a right side elevation view of the example cover assembly of FIG. 2.
Figure 6A:
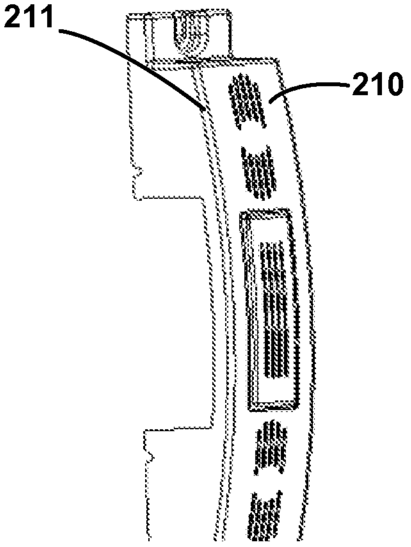
FIG. 6*a* is an illustration of the example operator-panel cover shown in FIG. 2.
Figure 6B:
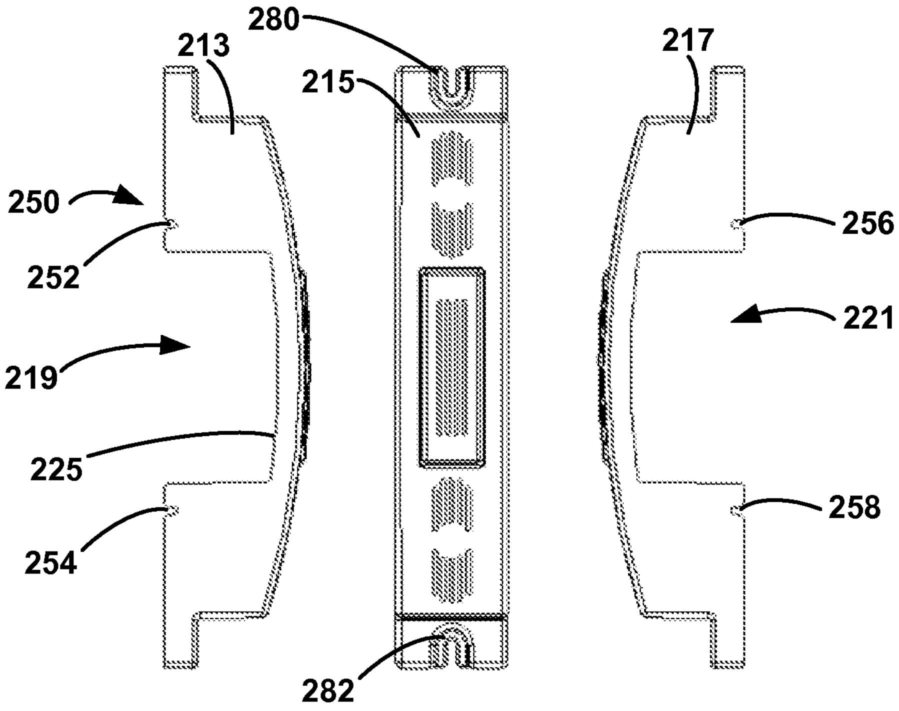
FIG. 6*b* is an exploded view of the operator-panel cover of FIG. 6*a*, depicting the left, center, and right of the operator-panel cover.
Figure 7A:
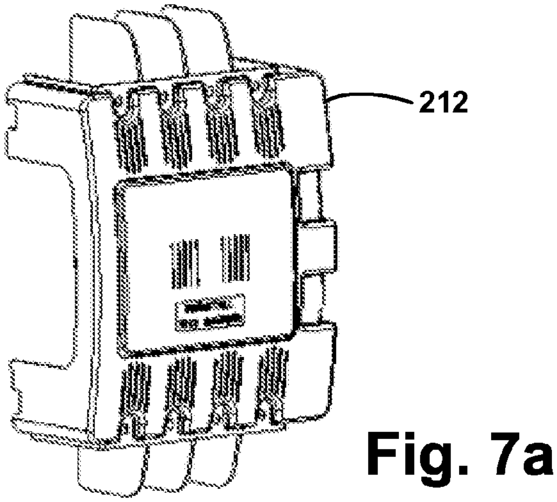
FIG. 7*a* is an illustration of the example pole-assembly cover shown in FIG. 2.
Figure 7B:
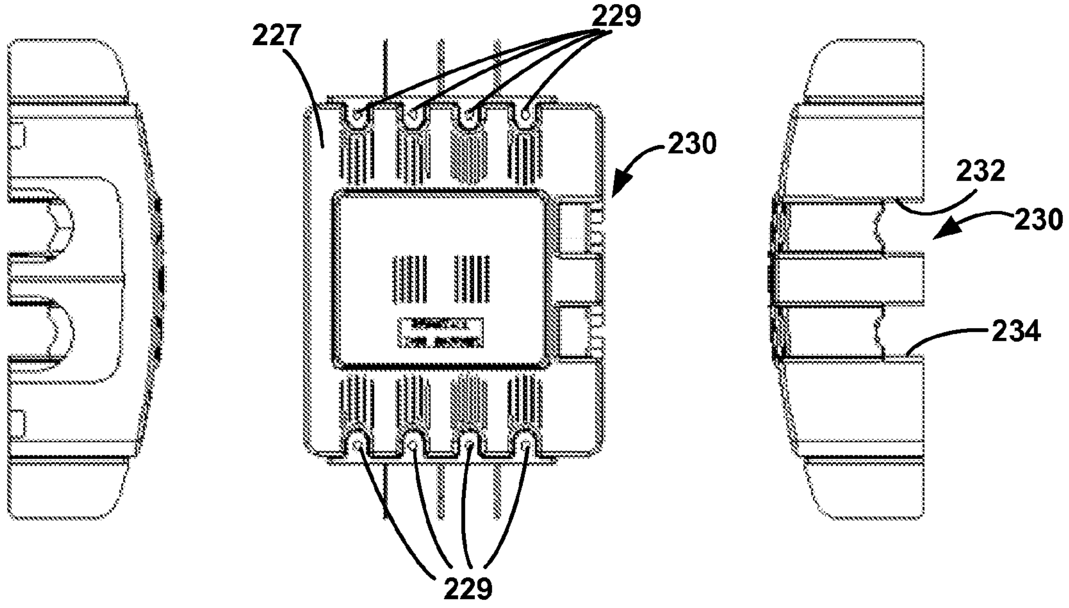
FIG. 7*b* is an exploded view of the pole-assembly cover of FIG. 7*a*, depicting the left, center, and right of the pole-assembly cover.

Additional views of system 200, operator-panel cover 210, and/or pole-assembly cover 212 are shown in FIGS. 3-7*b*. In particular, FIG. 3 is a front elevation view of system 200, FIG. 4 is a left side elevation view of system 200, and FIG. 5 is a right side elevation view of system 200. Further, FIG. 6*a* is a detailed illustration of operator-panel cover 210, and FIG. 6*b* is an exploded view of the operator-panel cover 210. Still further, FIG. 7*a* is an illustration of pole-assembly cover 212, and FIG. 7*b* is an exploded view of pole-assembly cover 212. Additional details of the disclosed cover assembly 204 are described below, with reference to these various views where appropriate.

In an example embodiment, the operator-panel cover 210 prevents access to the solenoid(s) and associated wiring when the operator-panel cover 210 is installed over the operator-panel portion 206. As mentioned above, existing operator-panel covers may only cover the solenoid(s), while leaving the associated wiring and other components uncovered (e.g., as shown in FIG. 1). Beneficially, the disclosed cover assembly 204 substantially encloses the entire operator-panel portion 206, thus preventing access to the solenoid(s), associated wiring, and other components when the operator-panel cover 210 is installed over the operator-panel portion 206. In an example, the operator-panel cover 210 encloses or substantially encloses the solenoid assembly, the weight and CAM shaft assembly, and the auxiliary contact assembly of the operator-panel portion 206.

In an example embodiment, the operator-panel cover 210 and pole-assembly cover 212 are separate covers, such that the operator-panel cover 210 and pole-assembly cover 212 may be removed from the ATS 202 independently. For instance, as can be seen clearly in FIGS. 6*a* and 7*a*, the operator-panel cover 210 and pole-assembly cover 212 are separate covers. These separate covers 210, 212 may be manufactured, installed, and/or replaced separately. However, in another example embodiment, the operator-panel cover and pole-assembly cover may be a single unit (i.e., a single cover).

In an example embodiment, the operator-panel cover 210 is configured for use with a dual solenoid arrangement as well as a single solenoid arrangement. For example, with reference to FIGS. 2 and 4, the operator-panel portion 206 includes a dual solenoid arrangement, which includes top solenoid 222 and bottom solenoid 224. However, in other examples, the operator panel portion may include a single solenoid arrangement. For instance, the operator panel portion of a single solenoid arrangement may only include the top solenoid and not the bottom solenoid. As mentioned above, different customers may have different ATS requirements or needs, and thus different customers may select different solenoid arrangements based on the individual requirements of the customer.

Beneficially, the disclosed cover assembly 204 is configured to be used with a plurality of different ATS designs and solenoid configurations. Different ATS designs include, without limitation, open transistor switch ATSs, closed transition transfer switching ATSs, and delayed transition transfer switching ATSs. In an example, an ATS having an open transistor switch may only require a single solenoid arrangement. As another example, an ATS having a closed or delayed switch may require a dual solenoid arrangement. The disclosed cover assembly 204 is a versatile cover assembly, as the operator-panel cover 210 may be used on a plurality of these different ATSs, such as ATSs having different solenoid arrangements. Further, an additional benefit of the disclosed cover assembly is that, since the disclosed operator-panel cover 210 is a single cover that can cover a dual solenoid arrangement, time spent removing the cover of a dual solenoid arrangement may be significantly reduced (as opposed to existing covers that require a separate cover for each solenoid). With reference to FIG. 1, multiple operator-cover portions (i.e., solenoid covers 114 and 116) would need to be removed by an operator from the operator-panel portion 106 in order to fully access the operator panel 106, thus increasing the time an operator would need to spend installing ATS 102 or performing maintenance on ATS 102.

i. Pole-Assembly Cover with Side-Viewing Panel

In an example embodiment, the pole-assembly portion of the ATS may include a switch having a plurality of positions comprising a normal-operation position and an emergency-operation position. For instance, with reference to FIG. 1, pole-assembly portion 108 includes a switch portion 120. In existing covers, this switch portion 120 is left entirely uncovered. However, leaving the switch portion 120 completely uncovered may be undesirable, for example, due to safety reasons and/or reliable operation of the ATS.

It may be beneficial to substantially cover the switch portion, in order to provide improved protection for the ATS and an additional safety measure. The disclosed cover assembly 204 beneficially substantially covers the switch while simultaneously allowing an operator to view the status of the switch. In particular, the pole-assembly cover 212 includes a side-viewing panel configured to allow an operator to identify each of the plurality of positions of the switch.

An example side-viewing panel 230 is depicted in detail in FIGS. 5 and 7*b*. The side-viewing panel 230 may be positioned on a side of the body of the pole-assembly cover 212 at a position corresponding to a location of the switch on the pole-assembly portion. The side-viewing panel is thus configured to allow an operator to identify each of the plurality of positions of the switch. The side-viewing panel 230 may include at least one slot, wherein each of the at least one slot is positioned so as to allow viewing of a respective position of the plurality of positions. For instance, side-viewing panel 230 includes a first slot 232 and a second slot 234. Slot 232 is positioned to allow view of normal-operation position 236, and slot 234 is positioned to allow a view of emergency-operation position 238. The slots may be sized to allow an adequate view of the positions, while substantially covering the remainder of the ATS. As can be seen from FIG. 5, the slots 232, 234 are sized to be the same as or about the size of the portions of the switch showing the position of the switch.

Although pole-assembly cover 212 is shown as including two slots corresponding to two operational positions, it should be understood that more or fewer slots are possible as well, depending on the number of positions of a switch. For instance, the switch could have three or more operation positions, and the side-viewing panel may include three or more slots. In another example, rather than slots, the side-viewing panel may include at least one hole, wherein each of the at least one hole is positioned so as to allow viewing of a respective position of the plurality of positions. Other configurations of the side-viewing panel are possible as well.

ii. Improved Locking Arrangement for Operator-Panel Cover

The disclosed operator-panel cover also includes an improved locking arrangement for the cover assembly for an ATS. In particular, the operator-panel cover 210 may include a locking arrangement that comprises at least one snap-fit locking mechanism configured to interact with to at least one corresponding snap-fit locking mechanism of ATS 202. For example, as shown in detail in FIGS. 4 and 6*b*, the operator-panel cover 210 may include locking arrangement 250. In particular, the main body 211 of operator-panel cover 210 includes a left side 213, center portion 215, and right side 217. The locking arrangement 250 may be disposed on the distal portion of the left and right sides. For example, locking arrangement 250 may include snap-fit locking mechanisms 252 and 254 disposed on the distal end of the left side 213; similarly, locking arrangement 250 may include snap-fit locking mechanisms 256 and 258 disposed on the distal end of the right side 217, as shown in FIG. 6*b*. These snap-fit locking mechanisms may be positioned so as to interact with corresponding snap-fit locking mechanisms on the operator panel 206. The snap-fit locking mechanisms may interact to securely hold the operator-panel cover 210 on the operator panel 206. The improved locking arrangement may allow for simple installation of the operator-panel cover that does not require the use of equipment; therefore, the operator-panel cover 210 may be installed and removed both easily and quickly.

In another example, the locking arrangement for the operator-panel cover may include a plurality of holes for bolting the operator-panel cover to the operator-panel portion. A locking arrangement of this type may extend the installation and removal time of the operator-panel, as compared to the installation and removal time of an operator-panel cover having a snap-fit locking arrangement. For instance, the operator-panel cover 210 includes slots 280 and 282, which may be configured for mounting (e.g., bolting) the operator-panel cover to the operator-panel portion.

The pole-assembly cover 212 may also include a locking arrangement for attaching the pole-assembly cover to the pole-assembly portion. In an example, as can be seen in FIG. 7*b*, the body 227 includes a plurality of holes 229 for fitting the pole-assembly cover 212 on a base of the pole-assembly portion 208. In particular, as shown in FIG. 2, the holes may receive bolts 231 which may securely hold the pole-assembly cover 212 in place on the pole-assembly portion 208.

In an example, the pole-assembly cover 212 includes at least one flap that may provide for lug isolation. For instance, the ATS may include at least one lug, and the pole-assembly cover may include at least one flap, wherein each of the at least one flap is configured to isolate a first lug of the at least one lug from a second lug of the at least one lug.

As seen in FIG. 2, the example pole-assembly cover 212 includes flaps 290-295. Each respective flap provides isolation between respective lugs 297. The depicted flaps are substantially square-shaped flaps; however, it should be understood that the flaps may be any suitable shape that allows for the flaps to isolate a first lug from a second lug. For instance, the flaps could be rectangular-shaped flaps. Other shapes are possible as well. Beneficially, providing such flaps configured for lug isolation may improve the safety and operation of the transfer switch.

iii. Operator-Panel Cover Without Ventilation Louvers

As mentioned above, the operator-panel cover 210 may include a plurality of ventilation louvers for heat dissipation. In another example embodiment, the operator-panel cover may be provided without ventilation louvers. Rather, at least one side of the operator-panel cover may be designed such that heat dissipation may occur from the operator-panel portion to the external environment through the side of the operator-panel cover. With reference to FIGS. 4 and 6*b*, the right side 213 and left side 217 may each include a slot, such as slots 219 and 221. This slot may be configured to allow for airflow from the operator-panel portion 206 to the external environment through the side of the operator-panel cover 210. In particular, with reference to FIG. 4, there may be a space 223 between the operator-panel portion 206 and a proximal end 225 of slot 219. This space 223 may allow for heat dissipation from the operator-panel portion to the external environment through the side of the operator-panel cover 210. Notably, however, even if with such a space for heat dissipation, the operator-panel cover 210 still substantially covers the associated wiring of the operator-panel portion 206.

iv. Example Materials for Cover Assembly

The cover assembly 204 may be made of any suitable materials for covering an ATS. In general, any plastic with adequate fire-retardant properties may be used for the cover assembly 204. For instance, example suitable materials include, but are not limited to, SABIC N-190/EN-212 (i.e., Noryl™ Resin N190 or Noryl™ Resin EN212).

3. Example Benefits of Disclosed Cover Assembly

As described above, the proposed cover assembly provides and improved cover assembly for an ATS. For example, the disclosed cover assembly may cover the operator-panel portion such that the at least one solenoid and associated wiring are substantially enclosed. This may beneficially provide improved protection for the operator-panel cover. As another example, the operator-panel portion may be configured to cover both a single-solenoid arrangement and a dual-solenoid arrangement, beneficially avoiding the need for separate covers for each solenoid of the ATS. As yet another example, the disclosed cover assembly includes and improved locking mechanism that may, for example, provide a more simple installation of the ATS and cover assembly.

In addition, in accordance with an embodiment, the disclosed cover assembly may be used with any suitable transfer switch, such as a manual transfer switch (i.e., non-automatic transfer switches). The cover assembly may also be suitable for additional electrical and electronic equipment, such as power meters and switchgear products.

4. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A cover assembly for an automatic transfer switch (ATS), wherein the ATS comprises an operator-panel portion and a pole-assembly portion, wherein the operator-panel portion comprises at least one solenoid and associated wiring, the cover assembly comprising:

an operator-panel cover configured to cover the operator-panel portion such that the at least one solenoid and associated wiring are substantially enclosed, the operator-panel cover comprising a first plurality of ventilation louvers for heat dissipation; and a pole-assembly cover configured to cover the pole-assembly portion, the pole-assembly cover comprising a second plurality of ventilation louvers for heat dissipation;

wherein the pole-assembly portion comprises a switch having a plurality of positions comprising a normal-operation position and an emergency-operation position; and wherein the pole-assembly cover includes a side-viewing panel configured to allow an operator to identify each of the plurality of positions of the switch.

2. The cover assembly of claim 1, wherein the operator-panel cover prevents access to the solenoid and wiring when the operator-panel cover is installed over the operator panel.

3. The cover assembly of claim 1, wherein the operator-panel cover comprises a locking arrangement, wherein the locking arrangement comprises at least one snap-fit locking mechanism configured to interact with at least one corresponding snap-fit locking mechanism of the ATS.

4. The cover assembly of claim 1, wherein the operator-panel cover comprises a locking arrangement, wherein the locking arrangement comprises a plurality of holes for bolting.

5. The cover assembly of claim 1, wherein the operator-panel cover and pole-assembly cover are separate covers, such that the operator-panel cover and pole-assembly cover may be removed from the ATS independently.

6. The cover assembly of claim 1, wherein the operator-panel portion comprises a dual solenoid arrangement.

7. The cover assembly of claim 1, wherein the operator-panel portion comprises a single solenoid arrangement.

8. The cover assembly of claim 1, wherein the operator-panel cover is configured for use with an ATS having a dual solenoid arrangement as well as an ATS having a single solenoid arrangement.

9. An operator-panel cover for an operator-panel portion of an automatic transfer switch (ATS), wherein the operator-panel portion comprises at least one solenoid and associated wiring, the operator-panel cover comprising:

a body configured to cover the operator-panel portion such that the at least one solenoid and associated wiring are substantially enclosed, the body having a left side and a right side; and a locking arrangement, wherein the locking arrangement comprises at least two snap-fit locking mechanisms disposed on a distal end of the left side and at least two snap-fit locking mechanisms disposed on a distal end of the right side configured to interact with at least two corresponding snap-fit locking mechanisms of the ATS.

10. The operator-panel cover of claim 9, wherein the operator-panel portion is configured for covering, at separate times, an ATS having a dual solenoid arrangement as well as an ATS having a single solenoid arrangement.

11. The operator-panel cover of claim 9, further comprising a plurality of ventilation louvers for heat dissipation.

12. The operator-panel cover of claim 9, wherein the operator-panel cover prevents access to the at least one solenoid and associated wiring when the operator-panel cover is installed over the operator-panel portion.

13. A pole-assembly cover for a pole-assembly portion of an automatic transfer switch (ATS), wherein the pole-assembly portion comprises a switch having a plurality of positions comprising a normal-operation position and an emergency-operation position, the pole-assembly cover comprising:

a body configured to substantially cover the pole-assembly portion including the switch;

a plurality of ventilation louvers for heat dissipation disposed on the body; and a side-viewing panel positioned on a side of the body at a position corresponding to a location of the switch on the pole-assembly portion, the side-viewing panel configured to allow an operator to identify each of the plurality of positions of the switch.

14. The pole-assembly cover of claim 13, wherein the side-viewing panel comprises at least one slot, wherein each of the at least one slot is positioned so as to allow viewing of a respective position of the plurality of positions.

15. The pole-assembly cover of claim 13, wherein the side-viewing panel comprises at least one hole, wherein each of the at least one hole is positioned so as to allow viewing of a respective position of the plurality of positions.

16. The pole-assembly cover of claim 13, wherein the body comprises a plurality of holes for fitting the pole-assembly cover on a base of the pole-assembly portion.

17. The pole-assembly cover of claim 13, wherein the ATS comprises at least one lug, and wherein the pole-assembly cover further comprises at least one flap, wherein each of the at least one flap is configured to isolate a first lug of the at least one lug from a second lug of the at least one lug.

* * * * *

UNITED STATES PATENT AND TRADEMARK OFFICE

CERTIFICATE OF CORRECTION

PATENT NO. : 9,099,256 B2
APPLICATION NO. : 14/141225
DATED : August 4, 2015
INVENTOR(S) : Devanand Ramchandra et al.

It is certified that error appears in the above-identified patent and that said Letters Patent is hereby corrected as shown below:

Title Page, below Item (22) insert
-- (30) Foreign Application Priority Data
(IN) 689/MUM/2013 March 7, 2013 --

Signed and Sealed this
Twelfth Day of January, 2016

Michelle K. Lee
*Director of the United States Patent and Trademark Office*